(12) United States Patent
Caldwell

(10) Patent No.: US 7,851,052 B2
(45) Date of Patent: Dec. 14, 2010

(54) COATING SYSTEM FOR SAG RESISTANT FORMALDEHYDE-FREE FIBROUS PANELS

(75) Inventor: Kenneth G. Caldwell, Mountville, PA (US)

(73) Assignee: AWI Licensing Company, Wilmington, DE (US)

( * ) Notice: Subject to any disclaimer, the term of this patent is extended or adjusted under 35 U.S.C. 154(b) by 1120 days.

(21) Appl. No.: 11/209,235

(22) Filed: Aug. 23, 2005

(65) Prior Publication Data

US 2007/0055012 A1    Mar. 8, 2007

(51) Int. Cl.
*B32B 27/00* (2006.01)
(52) U.S. Cl. .................. 428/220; 428/212; 525/54.1
(58) Field of Classification Search .............. 428/212, 428/220; 525/54.1
See application file for complete search history.

(56) References Cited

U.S. PATENT DOCUMENTS

| | | | |
|---|---|---|---|
| 3,243,340 A | 3/1966 | Cadotte | |
| 3,833,534 A | 9/1974 | Gabbert et al. | ................ 260/37 |
| 4,435,220 A | 3/1984 | Watanabe et al. | |
| 4,490,179 A | 12/1984 | Bernhard | |
| 4,560,715 A | 12/1985 | Ueeda et al. | ................ 523/443 |
| 4,954,468 A | 9/1990 | Wason | |
| 5,017,627 A | 5/1991 | Bonfield et al. | |
| 5,075,093 A | 12/1991 | Tanaka et al. | |
| 5,556,527 A | 9/1996 | Igarashi et al. | ............. 204/488 |
| 5,714,200 A | 2/1998 | Schlachter et al. | .......... 427/209 |
| 5,776,615 A | 7/1998 | Wong et al. | |
| 5,851,680 A | 12/1998 | Heau | |
| 5,897,411 A | 4/1999 | Stark et al. | |
| 6,071,994 A | 6/2000 | Hummerich et al. | ........ 524/247 |
| 6,099,773 A | 8/2000 | Reck et al. | ................... 264/109 |
| 6,106,816 A | 8/2000 | Hitchen | .................... 424/70.16 |
| 6,146,746 A | 11/2000 | Reck et al. | ................... 428/220 |
| 6,235,367 B1 | 5/2001 | Holmes et al. | ................ 428/45 |
| 6,299,936 B1 | 10/2001 | Reck et al. | ................... 427/212 |
| 6,316,119 B1 | 11/2001 | Metzger et al. | ............. 428/520 |
| 6,419,019 B1 | 7/2002 | Palmer et al. | |
| 6,492,453 B1 | 12/2002 | Ebrahimian et al. | |
| 6,733,907 B2 | 5/2004 | Morrison et al. | |
| 6,743,285 B1 | 6/2004 | Anselmann et al. | |
| 6,759,128 B1 | 7/2004 | Zhao et al. | |
| 6,906,132 B2 | 6/2005 | Belmares et al. | |
| 2001/0016273 A1 | 8/2001 | Narasimhan et al. | |
| 2004/0039098 A1 | 2/2004 | Belmares et al. | |

FOREIGN PATENT DOCUMENTS

| | | |
|---|---|---|
| EP | 0 379 728 | 8/1990 |
| EP | 1 039 342 | 9/2000 |
| EP | 1 160 387 | 12/2001 |
| JP | 2004269641 A | 9/2004 |

*Primary Examiner*—David R Sample
*Assistant Examiner*—Lawrence D Ferguson

(57) ABSTRACT

A coating system on a fibrous substrate, such as a fibrous ceiling panel, having a first surface and a second surface. A first coating is disposed on the first surface of the substrate and includes a first binder and a first filler material. A second coating may be disposed on the second surface of the substrate. The second coating includes a second binder and a second filler material. The first coating and the second coating expand at different rates in the presence of humidity in order to help prevent sagging of the substrate in presence of humidity. The first coating is preferably a hydrophobic coating having a large particle size, high elastic modulus filler material. The second coating is preferably a hydrophilic coating having a lower concentration of high elastic modulus material and a polymer having a hydrophilic moiety.

8 Claims, 4 Drawing Sheets

COATING SYSTEM FOR SAG RESISTANT FORMALDEHYDE-FREE FIBROUS PANELS

FIELD OF THE INVENTION

The present invention is directed to formaldehyde-free coating systems on fibrous and acoustical panels to impart sag resistance.

BACKGROUND OF THE INVENTION

Acoustical panels are used for a variety of different purposes including in suspended ceilings and generally are comprised of an array of different fibers, binders and fillers. Primarily, fibrous panels are made from mineral wool, perlite, cellulosic fibers, fillers and binders.

Panel production utilizes combinations of fibers, fillers, bulking agents, binders, water, surfactants and other additives mixed into a slurry and processed into a panel. Cellulosic fibers are typically in the form of newsprint. Fillers may include expanded perlite, brighteners, such as titanium oxide, and clay. Binders may include starch, latex and reconstituted paper products linked together to create a binding system locking all ingredients into a structural matrix.

Organic binders, such as starch, are often the primary component providing structural adhesion for the panel. Starch is a preferred organic binder because, among other reasons, it is relatively inexpensive. For example, panels containing newsprint, mineral wool and perlite can be bound together economically by starch. Starch imparts both strength and durability to the panel structure, but is susceptible to moisture. Moisture can cause the panel to soften and sag, which is unsightly in a ceiling and can lead to the weakening of the panel.

One method used to counter moisture susceptibility in panels is to back-coat the panels with a melamine-formaldehyde resin based coating with or without a urea-formaldehyde component. When such a formaldehyde resin based coating is exposed to moisture or humidity it tends to expand, which can prevent or inhibit sagging.

Cured melamine-formaldehyde resins contain residual methylol end groups, amines and melamine nitrogen that have a high affinity for water. The resin has a flexible crosslink structure that can expand as the coating picks up moisture by virtue of hydrogen bonding. When a melamine-formaldehyde resin based coating is applied to the back of an acoustical panel, the coating expands in humid conditions. The force created by the expansion of the back of the panel tends to counteract the sagging force of gravity. However, this coating system suffers from the drawback that formaldehyde resins tend to emit formaldehyde, which is a known environmental irritant.

To decrease formaldehyde emissions, the addition of formaldehyde reactive materials, such as urea, have been used to scavenge the free formaldehyde. Unfortunately, such small molecule scavengers end cap the reactive groups of the formaldehyde resin, thus preventing significant levels of crosslinking from occurring. As a result, the characteristic highly crosslinked elastic polymer structure is never formed. Therefore, this coating system suffers from the drawback that the resulting coating is weak and will not expand significantly upon exposure to humidity, and therefore the coated panel's resistance to sag is greatly impaired.

In another attempt to decrease formaldehyde emissions, a formaldehyde-free back coating containing polymeric resins having a hydrophilic moiety and having a compound with a modulus of elasticity from about 40 GPa to about 250 GPa may be provided on the acoustical panel in order to increase the sag resistance. This approach is described in U.S. patent application Ser. No. 10/225,892 entitled "Formaldehyde Free Coatings and Acoustical Panel" to Belmares et al., which is herein incorporated by reference in its entirety, hereinafter referred to as "Belmares". The back coating of Belmares suffers from the drawback that, when used with conventional acoustical panel materials, does not meet industry standard sag requirements. In order to meet the standard sag requirements with the back coating disclosed in Belmares on 2'×4' ceiling panels, a more expensive, premium acoustical board substrate must be used. The premium acoustical substrate significantly increases the cost of the ceiling panel products as compared to conventional formaldehyde-containing ceiling panels.

Therefore, what is needed is a coating system capable of providing a reduced sag on less expensive board materials, without emitting an environmental irritant.

SUMMARY OF THE INVENTION

The present invention comprises a formaldehyde-free coating system for fibrous substrates comprising a first coating disposed on a first surface of a fibrous substrate. A second coating may be disposed on a second surface of the fibrous substrate. The first coating comprises a first coating binder comprising a polymer. The first coating further includes a first coating filler material having a modulus of elasticity of between about 40 GPa and about 250 GPa. The first coating filler material is a hydrophobic, large aspect ratio platelet-shaped, large particle sized material. The second coating includes a second coating binder formed from a polymer having a hydrophilic moiety chemically attached to a crosslinked system. The second coating further includes a second coating filler material having a modulus of elasticity of between about 40 GPa and about 250 GPa. The second coating has a concentration of second filler material that is less than the concentration of first filler material in the first coating.

In another example embodiment of the present invention, the substantially hydrophilic second coating is omitted, and the first coating is applied to either or both of the facing side and backing side of the fibrous substrate. This embodiment provides a reduction in sag by providing the benefits of the first coating, including hydrophobicity and structural stability to one or both of the facing side and the backing side.

The invention further comprises a method of coating a fibrous substrate. The method includes providing a substrate having a facing side and an opposing backing side. A substantially hydrophobic first coating is applied to the facing side of the substrate. The first coating includes the first coating binder and a hydrophobic first coating filler material having a modulus of elasticity of between about 40 GPa and about 250 GPa. A hydrophilic second coating is then applied to the backing side of the substrate. The coating includes a second coating binder comprising a polymer system having a chemically bonded hydrophilic moiety, and a second coating filler material having a modulus of elasticity of between about 40 GPa and about 250 GPa.

One advantage of the coating system of the present invention is that the combination of the face coating with the back coating reduces the sag of the fibrous substrates, such as fibrous panels for use as ceiling panels. This sag resistance is a result of the face coating (i.e., the hydrophobic coating on the facing side of the panel) stabilizing the face side of the panels, providing for little or no face side expansion or weakening on exposure to high humidity. Simultaneously, the back coating (i.e., the hydrophilic coating on the backing side of the panel) expands significantly at that same high humidity. The back coating expansion together with the little or no expansion of the face coating on the facing side of the ceiling panels results in a force vector upward in the opposite direction of gravity perpendicular to the faces when the fibrous panels are installed face down in the ceiling grid. The result of the expansion of the back coating with little or no expansion of the face coating is a compressive stress adjacent the facing side of the panel and a tensile stress adjacent the backing side of the panel, which provides an overall dimensional stability to the panel.

Another advantage of the present invention is that the coating system reduces the cost of the fibrous panel products by allowing the use of a lower cost panel substrate, while maintaining resistance to sag that meets or exceeds industry standards.

Still another advantage of the present invention is that the coating system according to the present invention permits the fabrication of larger fibrous panels having a sag performance that meet industry standards.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
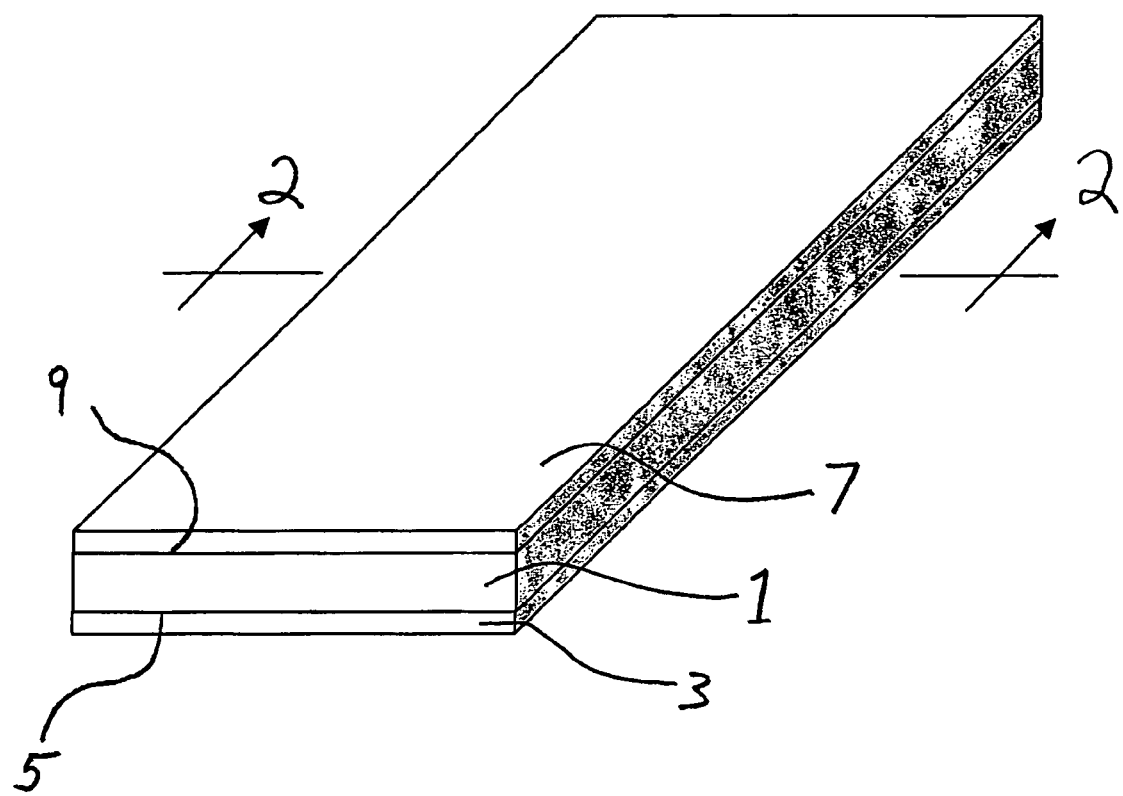
FIG. 1 illustrates a perspective view of a coated panel having a face coating and a back coating according to an example embodiment of the invention.

FIG. 1 shows a perspective view of a fibrous panel 1 according to one embodiment of the present invention. Fibrous panel includes a face coating 3 on a first surface 5 of the fibrous panel 1 and a back coating 7 on a second surface 9 of the fibrous panel 1. The face coating 3 on the first surface 5 or the facing side of the fibrous panel 1 is substantially hydrophobic, wherein moisture, such as moisture in the form of humidity, is substantially prevented from penetrating into first surface 5 of the fibrous panel 1. The back coating 7 on the second surface 9 or backing side of the fibrous panel 1 is substantially hydrophilic and expands in the presence of moisture, such as moisture in the form of humidity.

The fibrous panels 1 for use with the coating systems of the present invention include acoustical panels used in suspended ceiling systems or other fibrous panels used as building materials. The fibrous panels 1 include one or more of fibers, binders, and fillers. The fibrous panels 1 may have any geometry that includes a first surface and second surface suitable for use as building materials. Although any suitable geometry may be used, the fibrous panels 1 preferably have a rectangular geometry with a thickness sufficient to provide structural stability with a minimal amount of sag when coated with the coating systems according to the present invention. The fibrous panels 1 according to the present invention are preferably made from a combination of mineral wool, perlite, cellulosic fibers, fillers, and binders.

The coatings according to the present invention include coating systems that are formaldehyde-free or, in another embodiment, the coatings may include compositions that are substantially formaldehyde-free. The term "substantially formaldehyde-free" is defined as meaning that an incidental or background quantity of formaldehyde (less than 100 parts per billion "ppb") may be present in the coating composition and be within the scope of the invention.

The face coatings 3 according to the present invention comprise a polymeric binder, and a face coating filler material. In addition, the face coating 3 according to the present invention may also include optional additives such as filler pigments, surfactants, biocides, defoamers, and viscosity modifiers.

The face coating filler material includes a highly hydrophobic, large aspect ratio platelet shaped, large particle sized filler material. The filler material of the face coating 3 provides the fibrous panels with increased elastic modulus and/or stiffness on the facing side of the panel. The face coatings 3 according to the present invention are substantially dimensionally stable during changes in humidity. The filler pigment has a modulus of elasticity of between about 40 GPa and about 250 GPa in order to increase the elastic modulus (stiffness) of the coating. The size of the particles contained in the face coating filler material is preferably between about 10 microns and about 250 microns. In a more preferred embodiment, the size of the particles contained in the face coating filler material is between about 10 microns and about 75 microns. In a still more preferred embodiment, the size of the particles contained in the face coating filler material is about 39 microns. The size of the face coating filler material and the concentration of the face coating filler material in the face coating 3 render the coating hydrophobic and provide the panel with structural stability. The face coating filler material is sufficiently hydrophobic to prevent humidity penetration into the coating. Humidity penetration may result in expansion of the coating and hence the face of the panel or may reduce the coating's modulus of elasticity at high humidity. The prevention of the humidity penetration substantially prevents the expansion of the coating and hence the face of the panel and the reduction of the modulus of elasticity of the coating when exposed to higher humidity. The high aspect ratio platelet shape and large size of this filler material contributes to the high modulus and the strong hydrophobicity of the coating by forming a continuous layer of overlapping platelets.

The high modulus of elasticity face coating filler materials having a modulus of elasticity of between about 40 GPa and about 250 GPa may include, but are not limited to: mica such as that derived from muscovite, phlogopite and pegmatite, or mica synthetically derived from electrothermally grown crystals, hydrated aluminum silicate derived from pyrophyllite, ground stainless steel type 304, titanium carbide, magnesium-partially stabilized zirconia, such as magnesium-stabilized zirconia, clear fused quartz, and borosilicate glass. Other suitable materials include materials having a modulus of elasticity of between about 40 GPa and about 250 GPa may also be used.

The amount of high modulus face coating filler material present in the face coatings 3 may range from about 2 weight % to about 80 weight % based on dry solids of the formula. Unless otherwise noted all percentages are provided in weight percent. One preferred formula contains about 8.3% (see Example 1, below) face coating filler material based on the total dry formula. Another preferred formula contains about 29.1% (see Example 2, below) face coating filler material based on the total dry formula. The polymeric face coating binder content may range from about 5% to about 50%. One preferred formula contains about 16.7% face coating binder base on the total dry formula. Another preferred formula contains about 16.6% of face coating binder based on the total dry formula. The face coating 3 may be made up of about 5% solids to about 80% solids in water. The solids % of the formula is preferably based on the highest solids that do not exceed the required viscosity for application. For example, in spraying operations, the percent solids should provide a viscosity sufficiently low so as to render the spray nozzle operable. Two preferred face coating 3 formulas include about 42% solids and about 44% solids, respectively, in water.

A preferred face coating filler material having a high modulus of elasticity is mica. Mica is a platelet (leaflet) and adds reinforcement and rigidity to the binder system that results in a stronger, high elastic modulus coating. In mica, $KAl_3Si_3O_{10}(OH)_2$, the aluminosilicate layers are negatively charged, and the positive ions, usually potassium ions, are present between the layers to give the mineral electric neutrality. The electrostatic forces between these positive ions and the negatively charged layers make mica considerably harder than kaolinite and talc. Mica's layered structure permits the mineral to be split into very thin sheets. These layers slide over one another readily.

Mica may be any one of several silicates of varying chemical compositions. For example, mica may be naturally derived from muscovite, phlogopite and pegmatite, or mica may be synthetically derived from electrothermally grown crystals. Mica is included in the coating composition to regulate the expansion, elasticity and modulus of the coating under humid conditions. It is believed that the leaflet structure of mica contributes greatly to the binder's ability to maintain the fibrous panels 1 in a flat or substantially flat condition over a wide range of relative humidity and temperature.

Other additives to the face coating 3 may include, but are not limited to: titanium dioxide or other white pigments, clay, calcium carbonate, dolomite, sand, barium sulfate, silica, talc, gypsum, wollastonite, calcite, aluminum trihydrate, zinc oxide, zinc sulfate, hollow glass beads, perlite, and mixtures thereof. The face coatings compositions may also contain water, dispersants, organic fillers, catalysts, color pigments, surfactants, buffer agents, viscosity modifiers, stabilizers, defoamers, flow modifiers, and combinations thereof.

The face coating binder according to the present invention may include, but are not limited to: starch, protein, other natural polymers, thermal set acrylics, vinyl polymers, thermoplastic acrylics, epoxies, urethanes, polyesters, and polyamides. In addition, the polymer binders may include, but are not limited to, one or more of the following monomers: vinyl acetate, vinyl propionate vinyl butyrate, vinylidene chloride, vinyl chloride, vinyl bromide, ethyl acrylate, methyl acrylate, propyl acrylate, butyl acrylate, ethyl methacrylate, hydroxyethyl acrylate, acrylonitrile, isocyanate, urethane, epoxy, esters, ethers, carbonates, amides, silicones, methylene, propylene, styrene, butadiene, alkyds, maleic acid or anhydride. Suitable natural polymers include proteins, such as milk or soy protein, and carbohydrate polymers, such as starch. In a preferred embodiment, the face coating binder is starch. In another preferred embodiment, the face coating binder is a thermoset acrylic resin.

The polymers in the first coating binder may be obtained by any suitable method including, but not limited to: condensation, addition, free radicals, living polymerization, grafting, anionic and cationic polymerization, block copolymerization, cycloaddition, emulsion polymerization, enzyme-catalyzed polymerization, ladder polymerization, photopolymerization, tautomer polymerization, group transfer polymerization or a combination thereof. In an embodiment of the invention, the first coating binder system may include a polymer matrix resulting from the above methods.

In one embodiment of the present invention, the polymer system of the face coating may comprise polymers, copolymers, terpolymers and combinations thereof of vinyl acetate, vinyl propionate vinyl butyrate, vinylidene chloride, vinyl chloride, vinyl bromide, ethyl acrylate, methyl acrylate, propyl acrylate, butyl acrylate, ethyl methacrylate, hydroxyethyl acrylate, acrylonitrile, isocyanate, urethane, epoxy, esters, ethers, carbonates, amides, silicones, methylene, propylene, styrene, butadiene, alkyds, maleic acid or anhydride.

The present invention further includes a formaldehyde-free back coating 7 comprising a crosslinkable binder having a hydrophilic moiety chemically attached to the crosslinked system, as disclosed in Belmares. The hydrophilic group provides a high affinity for water and the crosslinked system imparts elastomeric properties that allow for expansion as water is absorbed under humid conditions.

The back coating 7 additionally includes a back coating filler material having a high modulus of elasticity, as disclosed in the previously cited Belmares reference. The modulus of elasticity may range from about 40 GPa to about 250 GPa. In a further embodiment, the modulus of elasticity of the back coating filler material may range from about 160 GPa to about 250 GPa. Unlike the face coating filler material, the back coating includes a lower concentration of back coating filler material. The back coating may contain from about 1% to about 60% by dry weight of back coating filler material. The back coating composition provides a highly crosslinked structure, with high affinity for water and good elastomeric properties that allow for the coating to swell and expand under high humidity. The force created by the expansion of the coating on the second surface 9 or the backing side of the panel counteracts the force of gravity that otherwise tends to make the panel sag.

The combination of these face coatings 3 with the back coating 7 provide a reduction in the susceptibility of the fibrous panel to sag when exposed to humidity. In particular, the face coatings 3 stabilizes the first surface 5 of the fibrous panel 1 providing for substantially no first surface 5 expansion or weakening when exposed to atmospheres that include high humidity. The stabilization of the first surface 5 of the fibrous panel 1 results in at least two desirable properties. First, the face coating 3 is substantially hydrophobic and prevents the penetration of humidity into the fibrous panel 1. The reduction in the penetration of the moisture from the humidity reduces the expansion rate of the fibrous panel 1 when exposed to high humidity. Second, the face coating 3 provides a coating having a large elastic modulus that produces localized compressive stresses along the first surface 5 of the fibrous panel 1. The compressive stresses stabilize the material near the surface of the first surface 5 of the fibrous panel 1 that substantially resists of the downward force 11 due to gravity that results in sag.

In addition to the stability created by the face coating 3, the back coating 7 expands significantly when exposed to the same atmosphere containing high humidity. The back coating 7 expansion together with little or no expansion of the face coating 3 of the fibrous panels 1 results in a force vector upward in the opposite direction of gravity when the panels 1 are installed with the first surface 5 facing downward with respect to the direction of gravity in the ceiling grid.

Figure 2:
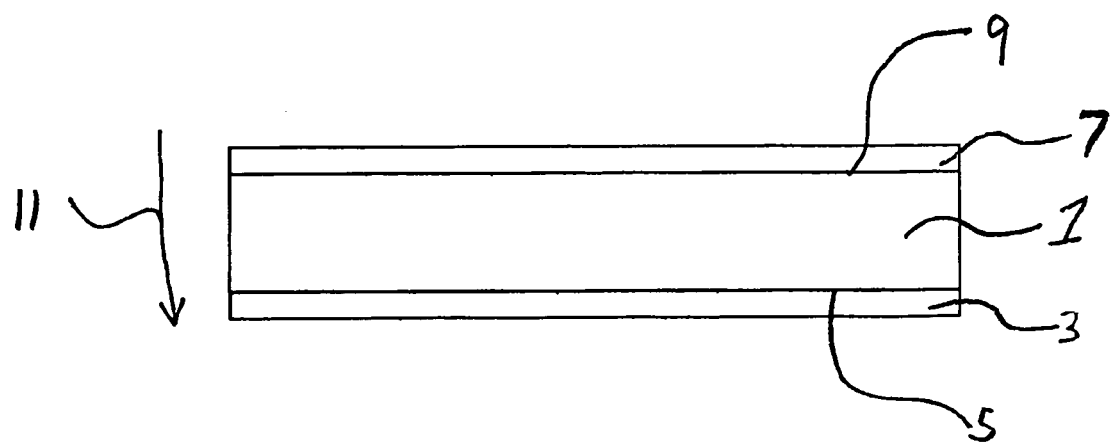
FIG. 2 illustrates a cross section taken along line 2-2 of FIG. 1 of a coated panel having a face coating and a back coating according to an embodiment of the invention.

One embodiment shown in FIG. 2 includes a coated panel as illustrated in the cross section taken along line 2-2 of FIG. 1. Similar to FIG. 1, the coated panel has a first surface 5 and a second surface 9. A face coating 3 is disposed on the first surface 5. A back coating 7 is disposed on the second surface 9 of the coated panel. The combination of the face coating 3 and the back coating 7 counteract the sagging effect of gravity 11 in humid condition. In a preferred embodiment, the fibrous panel 1 is a ceiling panel that is installed in a suspended ceiling. The second surface 9 may be the side that is directed to the plenum above the panel in the suspended ceiling tile system. In another embodiment, the coated panel may be an acoustical panel for attenuating sound.

Figure 3:
FIG. 3 illustrates a cross section taken along line 2-2 of FIG. 1 of a coated panel having a face coating according to another example embodiment of the invention.

In another embodiment, shown in FIG. 3, the coated panel includes a face coating 3 on the first surface 5 of the fibrous panel 1. Unlike the embodiment shown in FIG. 2, the coated panel does not include a back coating 7. This embodiment eliminates the expense of the back coating, while maintaining the benefits, including the structural stability and hydrophobicity of the face coating 3. The thickness of the face coating 3 may be increased to provide additional structural stability and hydrophobicity in order to improve the sag resistance in the absence of the back coating 7.

Figure 4:
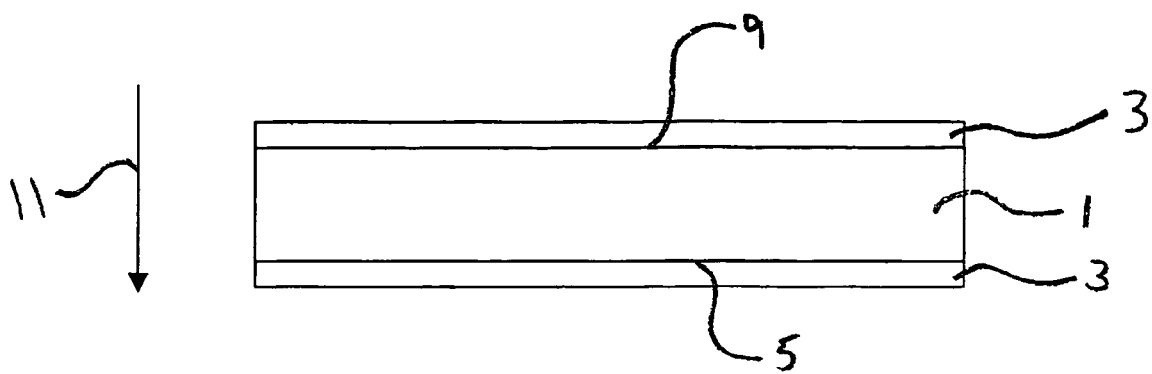
FIG. 4 illustrates a cross section taken along line 2-2 of FIG. 1 of a coated panel having multiple face coatings according to still another example embodiment of the invention.

In another embodiment, shown in FIG. 4, the coated panel includes a face coating 3 applied to the first surface 5 and another face coating 3 applied to the second surface 9 of the fibrous panel 1. This embodiment provides the structural stability and hydrophobicity of the face coating on the first surface 5 and the second surface 9 of the fibrous panel 1. Providing hydrophobic coatings on each of the first surface 5 and the second surface 9, allows little or no moisture to penetrate into first surface 5 of the fibrous panel 1. This moisture prevention reduces the amount of swelling of the material of the fibrous panel 1, which thereby reduces the amount of sag. In addition, the structural benefits of the face coating 3 are provided on both the first surface 5 and the second surface 9 of the fibrous panel 1, further increasing the resistance to sagging.

An additional embodiment includes a method of coating a panel including the steps of applying the face coating 3 and/or the back coating 7 to a fibrous panel 1. The coating particles or solids in the composition for the face coating 3 and back coating 7 are preferably suspended in an aqueous carrier, which may include an organic solvent. The first coating composition and/or second coating composition may be applied by such methods as roll coating, spraying, curtain coating, extrusion, knife coating and combinations thereof. In a preferred embodiment, the compositions are sprayed onto the fibrous panel 1. Suitable application rates for this coating, include, but are not limited to from about 2 grams per square foot "g/ft$^2$" to about 200 g/ft$^2$, from about 5 g/ft$^2$ to about 40 g/ft$^2$, and from 7.5 g/ft$^2$ to about 25 g/ft$^2$ on a wet basis. In one embodiment, the first coating 3 is applied to the first surface 5 or the facing side of the fibrous panel and the back coating 7 is applied to the second surface 9 or the backing side of the fibrous panel.

Although FIGS. 1-4 illustrate a rectangular geometry for the fibrous panel 1, the panels 1 may having any geometry useful as a building material. Additional suitable geometries include, but are not limited to, square, circular, or oval geometries. In addition, although FIGS. 2-4 illustrate panels 1 installed perpendicular relative to the direction of gravity, the panels are not limited to the installation configuration shown. The panels of the present invention may be installed in any configuration, including but not limited to parallel to the direction of gravity (i.e., the faces of the panel are positioned substantially vertically), perpendicular to the direction of gravity with the face coating upwards, or any angle from parallel to perpendicular to the direction of gravity. Further, the relative thickness of the face coating 3 and back coating 7 in FIGS. 1-4 is merely illustrative and do not represent total coating thickness or the relative coating thickness of the face coating 3 to the back coating 7.

The face coating binder may be in the face coating composition in a range from about 5% to about 50%, from about 10% to about 40%, and from about 15% to about 18% by dry weight. The amount of high modulus face coating filler material in the face coatings is preferably from 1% to 80%, from about 1% to about 60%, from about 5% to about 40%, and from about 9% to about 30% based on weight percent of the dry solids of the formula. The face coating 3 can be made of about from 5% solids to 80% solids in water depending on the other components. The solids % of the formula of the face coating 3 is usually based on the highest solids that do not exceed the required viscosity for application.

The second coating binder may be in the back coating composition in a range from about 1% to about 80%, from about 10% to about 40%, and from about 15% to about 18% by dry weight. The amount of high modulus back coating filler material in the back coatings is preferably from about 1% to 80%, from about 1% to about 60%, from about 5% to about 40%, and from about 9% to about 16% based on the weight percent of dry solids of the formula. The back coating 7 can be made up of about from 15% solids to 80% solids in water depending on the other components. The solids % of the formula is usually based on the highest solids that do not exceed the required viscosity for application. For example, in spraying operations, the percent solids should provide a viscosity sufficiently low so as to render the spray nozzle operable.

The face coating 3 and the back coating 7, once applied, can be thermally cured. For example, the coating may be cured at temperatures ranging from about 350° F. to about 700° F. and for a duration as short as about 15 seconds to about 15 minutes. In one embodiment of the present invention, the curing takes place at a temperature from about 650° F. to about 700° F. for about 1 to about 3 minutes. In another embodiment of the present invention, the curing takes place at a temperature from about 400° F. to about 450° F. for about 10 to about 12 minutes. A coating surface temperature of about 390° F. is preferably achieved in order to determine the completion of the curing.

The face coatings 3 according to the present invention, including when applied in combination with back coatings 5, preferably provide a total amount of sag for a 2'×4' fibrous panel 1 of less than about 300 mils when exposed to alternating atmospheres between about 90% relative humidity (RH) and about 35% RH. In a more preferred embodiment, the face coatings 3 according to the present invention provide a total amount of sag of less than about 250 mils. Still more preferably, the face coatings 3 according to the present invention provide a total amount of sag of less than about 200 mils.

The sag rates for a fibrous panel are the greatest measured distance that any portion of the panel sags below a flat plane, as defined by the edges of the panel when the panel is suspended in an apparatus, such as a suspended ceiling support system per a linear distance measured from the maximum point of sag to the point of the panel farthest from the maximum point of sag. For example, the greatest measured distance of sag for a square panel typically is at or near the center of the square panel. The greatest linear distance for the square panel is measured from the maximum point of sag to the point of the panel farthest from the maximum point of sag is the distance from the center for the square to the corner of the square. For example in a 2'×2' square panel, the greatest linear distance from the center is about 1.42 ft. The rate of sag is preferably minimized, such that the panel, regardless of geometry, sags at a rate that provides an aesthetically pleasing panel, even when exposed to humidity. In a preferred embodiment, the coating system of the present invention provides the fibrous panel 1 with a sag resistance such that the sag rate in terms of linear distance between the point of maximum sag and the point of the panel farthest from the maximum point of sag is less than about 134 mils/ft. In a more preferred embodiment the sag rate of the fibrous panel 1 is less than about 111 mils/ft. In a still more preferred embodiment the sag rate of the fibrous panel 1 is less than about 89 mils/ft. For example, in one embodiment, a 2'×4' fibrous panel 1, may result in a total sag distance below the supports at the center of the panel 1 less than about 300 mils, corresponding to a sag rate of less than about 134 mils/ft (i.e., less than 300 mils total sag distance at the center of the panel divided by 2.24 ft from the center of the panel to the corner of the rectangular panel).

Thus, a fibrous panel 1 coated with a coating according to the forgoing disclosure exhibits exceptional moisture induce sag resistance while emitting or outgassing little or no formaldehyde.

EXAMPLES

Example 1

Table 1 shows a composition for a face coating 3 representing Example 1 of the present invention having a modified starch based prime face coating with 8.33% of high modulus filler.

TABLE 1

| Ingredient | Description | Manufacturer | Address | Formula Weight | Weight % of Dry Formula |
|---|---|---|---|---|---|
| Water | | | | 1366.5 | |
| Modified Starch Binder | Ethylex 2025 | A. E. Staley Mfg. Co. | Decatur, IL | 250.0 | 16.65 |
| Clay Slurry 70% Solids | EG-44 Slurry | Theile Kaolin Co. | Sandersville, GA | 1414.3 | 74.95 |
| Mica (High Modulus Filler) | Alsibronz 39 | Engelhard | Hartwell, GA | 110.2 | 8.33 |
| Biocide | Metasol D3T-A | Calgon Corp. | Clark, NJ | 1.4 | 0.02 |
| Defoamer | Tego Foamex 1488 | Tego Cheme | Hopewell, VA | 2.9 | 0.05 |

Formula Solids = 42.0%
Pigment/Binder Ratio = 5.0
PVC = 74.5
Density lbs/gal = 10.91

The face coating composition of Example 1 is applied to a first surface of a fibrous acoustical panel at a rate of about 20 g/ft² wet weight onto a 2'×4' ceiling panel. A Formaldehyde-Free Back Coating is applied to a second surface of the panel. The back coating includes a composition, as described in the Belmares reference. Then both coatings are cured at about 410° F. for 11 minutes. Alternatively, the coatings may be cured at about 675° F. for 2 minutes. These acoustical ceiling panels are then place in a standard suspended ceiling grid and subjected to sag performance testing by exposing them to alternating cycles of high and low humidity. In these cycles, the panels will alternately see humidities of 90% relative humidity (RH) and 35% RH. After each 90%/35% RH cycle the panels are measured for sag. The sag is a measurement of the greatest distance that any portion of the panel sags below a flat plane, as defined by the edges of the panel. Overall sag values (S) are given as negative numbers, while any cupping upwards is a positive value. The sag values are provided in thousandths of an inch (mils).

TABLE 2

| Face Coating | Back Coating | S |
|---|---|---|
| Comparative Face Coating* | Comparative Back Coating** | −160 |
| Comparative Face Coating* | Formaldehyde Free Back Coating*** | −205 |
| Example 1 Coating | Formaldehyde Free Back Coating*** | −75 |

*The comparative face coating does not contain high modulus filler pigment.
**The comparative back coating is based on melamine formaldehyde with high formaldehyde emissions.
***The Formaldehyde Free Back Coating is a coating having the composition disclosed in Belmares.

Table 2 shows the sag performance resulting from the testing of the ceiling panels made according to Example 1 that includes placing the ceiling panels in a standard suspended ceiling grid and testing by exposing them to alternating cycles of high and low humidity. As shown in Table 2, the combination of the face coating 3 according to Example 1 in combination with the Formaldehyde Free Back Coating show a larger resistance to sag than either the Formaldehyde Free Back Coating alone or the known melamine formaldehyde back coating.

Example 2

Table 3 shows a composition for a face coating 3 representing Example 2 of the present invention including a thermoset acrylic-based face coating 3 having 29.14% of high modulus filler.

TABLE 3

| Ingredient | Description | Manufacturer | Address | Formula Weight | Weight % of Dry Formula |
|---|---|---|---|---|---|
| Water | | | | 1255.5 | |
| Thermoset Acrylic | Armstrong 1 Resin (50% Solids) | Rohm & Haas | Spring House, PA | 480.1 | 16.65 |
| Clay Slurry | EG-44 Slurry (70% Solids) | Theile Kaolin Co. | Sandersville, GA | 1114.7 | 54.16 |
| Pyrophyllite Aluminum Silicate | Pyrax B (High Modulus Filler) | R. T. Vanderbilt Co. | Norwalk, CT | 300.0 | 20.82 |

TABLE 3-continued

| Ingredient | Description | Manufacturer | Address | Formula Weight | Weight % of Dry Formula |
|---|---|---|---|---|---|
| Mica | Alsibronz 39 (High Modulus Filler) | Engelhard | Hartwell, GA | 120.0 | 8.32 |
| Defoamer | Tego Foamex 1488 | Tego Cheme | Hopewell, VA | 3.0 | 0.05 |

Formula Solids = 44.0%
Pigment/Binder Ratio = 5.0
PVC = 72.0
Density lbs/gal = 11.10

The face coating composition of Example 2 is applied at a rate of about 20 g/ft² wet weight onto 2'×2' or 2'×4' ceiling panels. And to the back of the panel is applied about 20 g/ft² of the Formaldehyde Free back coating according to Belmares. Then both coatings are cured at about 410° F. for 11 minutes. Alternatively, the coatings may be cured at about 675° F. for 2 minutes. These ceiling panels are then place in a standard suspended ceiling grid and subjected to sag performance testing by exposing them to alternating high and low humidity cycles.

TABLE 4

| Face Coating | Back Coating | S |
|---|---|---|
| Standard Face Coating* | Standard Back Coating** | −160 |
| Standard Face Coating* | Formaldehyde Free Coating*** | −205 |
| Example 1 Coating | Formaldehyde Free Coating*** | −75 |
| Example 2 Coating | Formaldehyde Free Coating*** | −55 |

*The standard face coating does not contain the high modulus filler pigment.
**The standard back coating is based on melamine formaldehyde with high formaldehyde emissions.
***The Formaldehyde Free Back Coating is a coating having the composition disclosed in Belmares.

Table 4 shows the sag performance resulting from the testing of the ceiling panels made according to Example 2 that includes placing the ceiling panels in a standard suspended ceiling grid and testing by exposing them to alternating cycles of high and low humidity. The results shown in Table 4 show significant improvement in sag performance resulting from the use of the Example 1 and Example 2 new face coatings together with the Formaldehyde Free back coating.

Example 3

Example 3 of the present invention includes the composition shown in Table 5. The composition of Example 3 includes the same face coating binder composition as Example 1, but including a increased concentration of high modulus face coating filler material.

TABLE 5

| Ingredient | Description | Manufacturer | Address | Formula | Weight % of Dry Formula |
|---|---|---|---|---|---|
| Water | | | | 1746.6 | |
| Modified Starch Binder | Ethylex 2025 | A. E. Staley Mfg. Co. | Decatur, IL | 250.0 | 16.65 |
| Clay Slurry 70% Solids | EG-44 Slurry | Theile Kaolin Co. | Sandersville, GA | 63.11 | 3.27 |
| Mica (High Modulus Filler) | Alsibronz 39 | Engelhard | Hartwell, GA | 1080.8 | 80.00 |
| Biocide | Metasol D3T-A | Calgon Corp. | Clark, NJ | 1.4 | 0.02 |
| Defoamer | Tego Foamex 1488 | Tego Cheme | Hopewell, VA | 2.9 | 0.05 |

Formula Solids = 42.0%
Pigment/Binder Ratio = 5.0
PVC = 74.5
Density lbs/gal = 10.91

TABLE 6

| Face Coating | Back Coating | S |
|---|---|---|
| Example 3 Coating | Formaldehyde Free Coating*** | −70 |

***The Formaldehyde Free Back Coating is a coating having the composition disclosed in Belmares.

Table 6 shows the sag performance resulting from the testing of the ceiling panels made according to Example 3 that includes placing the ceiling panels in a standard suspended ceiling grid and testing by exposing them to alternating cycles of high and low humidity.

Example 4

Example 4 includes the face coating composition shown in Table 7. The face coating composition of Example 4 has the same face coating binder composition as Example 1, but the composition of Example 4 includes a reduced concentration of high modulus face coating filler material.

TABLE 7

| Ingredient | Description | Manufacturer | Address | Formula Weight | Weight % of Dry Formula |
|---|---|---|---|---|---|
| Water | | | | 1330.8 | |
| Modified Starch Binder | Ethylex 2025 | A. E. Staley Mfg. Co. | Decatur, IL | 250.0 | 16.65 |
| Clay Slurry 70% Solids | EG-44 Slurry | Theile Kaolin Co. | Sandersville, GA | 1533.2 | 81.28 |
| Mica (High Modulus Filler) | Alsibronz 39 | Engelhard | Hartwell, GA | 27.0 | 2.0 |
| Biocide | Metasol D3T-A | Calgon Corp. | Clark, NJ | 1.4 | 0.02 |
| Defoamer | Tego Foames 1488 | Tego Cheme | Hopewell, VA | 2.9 | 0.05 |

Formula Solids = 42.0%
Pigment/Binder Ratio = 5.0
PVC = 74.5
Density lbs/gal = 10.91

TABLE 8

| Face Coating | Back Coating | S |
|---|---|---|
| Example 4 Coating | Formaldehyde Free Coating | −160 |

Table 8 shows the sag performance resulting from the testing of ceiling panels produced according to Example 4 that includes placing the ceiling panels in a standard suspended ceiling grid and testing by exposing them to alternating cycles of high and low humidity.

Example 5

Example 5 includes the face coating composition shown in Table 9. The face coating composition of Example 5 has the same face coating filler material as Example 1, but the composition of Example 5 includes an increased concentration of face coating binder.

TABLE 10

| Face Coating | Back Coating | S |
|---|---|---|
| Example 5 Coating | Formaldehyde Free Coating | −35 |

Table 10 shows the sag performance resulting from the testing of ceiling panels produced according to Example 5 that includes placing the ceiling panels in a standard suspended ceiling grid and testing by exposing them to alternating cycles of high and low humidity.

Example 6

Example 6 includes the face coating composition shown in Table 11. The face coating composition has the same face coating filler material as Example 1, but the composition of Example 6 includes a reduced concentration of face coating binder.

TABLE 9

| Ingredient | Description | Manufacturer | Address | Formula Weight | Weight % of Dry Formula |
|---|---|---|---|---|---|
| Water | | | | 2030.00 | |
| Modified Starch Binder | Ethylex 2025 | A. E. Staley Mfg. Co. | Decatur, IL | 750.0 | 50.00 |
| Clay Slurry 70% Solids | EG-44 Slurry | Theile Kaolin Co. | Sandersville, GA | 1057.16 | 41.60 |
| Mica (High Modulus Filler) | Alsibronz 39 | Engelhard | Hartwell, GA | 110.2 | 8.33 |
| Biocide | Metasol D3T-A | Calgon Corp. | Clark, NJ | 1.4 | 0.02 |
| Defoamer | Tego Foamex 1488 | Tego Cheme | Hopewell, VA | 2.9 | 0.05 |

Formula Solids = 30.0%
Pigment/Binder Ratio = 5.0
PVC = 74.5
Density lbs/gal = 9.45

TABLE 11

| Ingredient | Description | Manufacturer | Address | Formula Weight | Weight % of Dry Formula |
|---|---|---|---|---|---|
| Water | | | | 1401.7 | |
| Modified Starch Binder | Ethylex 2025 | A. E. Staley Mfg. Co. | Decatur, IL | 75.8 | 5.00 |
| Clay Slurry 70% Solids | EG-44 Slurry | Theile Kaolin Co. | Sandersville, GA | 1663.7 | 86.60 |
| Mica (High Modulus Filler) | Alsibronz 39 | Engelhard | Hartwell, GA | 110.2 | 8.33 |
| Biocide | Metasol D3T-A | Calgon Corp. | Clark, NJ | 1.4 | 0.02 |
| Defoamer | Tego Foamex 1488 | Tego Cheme | Hopewell, VA | 2.9 | 0.05 |

Formula Solids = 42.0%
Pigment/Binder Ratio = 5.0
PVC = 74.5
Density lbs/gal = 10.91

TABLE 12

| Face Coating | Back Coating | Sag mils |
|---|---|---|
| Example 6 Coating | Formaldehyde Free Coating | −175 |

Table 12 shows the sag performance resulting from the testing of ceiling panels produced according to Example 6 that includes placing the ceiling panels in a standard suspended ceiling grid and testing by exposing them to alternating cycles of high and low humidity.

Although the above has been described with respect to fibrous panels, ceiling panels and acoustic panels, the coating system of the present invention is suitable for use in other building applications susceptible to sag. The coating system according to the present invention may be utilized in other building material applications that expand when exposed to humidity and/or moisture.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A coated sag resistant building material comprising:
a substrate having a first surface and a second surface;
a hydrophobic first coating disposed on the first surface, the first coating comprising a first binder and a first filler material;
a hydrophilic second coating disposed on the second surface, the second coating comprising a second binder and a second filler material; and
wherein the first coating and the second coating expand at different rates in the presence of humidity, wherein the first coating and second coating are substantially formaldehyde free and wherein the coated substrate sags at a rate less than about 134 mils/ft.

2. The building material of claim 1, wherein the substrate is a fibrous panel.

3. The building material of claim 1, wherein the hydrophobic coating experiences no expansion in the presence of humidity.

4. The building material of claim 1, wherein the first filler material has a platelet geometry.

5. The building material of claim 1, wherein the first filler material is a material having a particle size of from about 10 microns to about 250 microns.

6. The building material of claim 1, wherein the first filler material is selected from the group consisting of mica, aluminum silicate, ground stainless steel, titanium carbide, magnesium-partially stabilized zirconia, quartz, borosilicate glass and combinations thereof.

7. The building material of claim 1, wherein the first binder material is a polymer selected from the group consisting of starch, protein, natural polymers, thermal set acrylics, vinyl polymers, thermoplastic acrylics, epoxies urethanes, polyesters, polyamides and combinations thereof.

8. The building material of claim 1, wherein the coated substrate sags at a rate less than about 89 mils/ft.

* * * * *